United States Patent [19]

Nakayama et al.

[11] Patent Number: 4,702,940
[45] Date of Patent: Oct. 27, 1987

[54] METHOD OF PRODUCING FILTER FOR AIR CLEANER

[75] Inventors: Toshiaki Nakayama, Kariya; Tokio Kohama, Nishio; Isamu Okada; Tamio Yokoyama, both of Kurita, all of Japan

[73] Assignees: Nippondenso Co., Ltd., Kariya; Kureha Ltd., Osaka, both of Japan

[21] Appl. No.: 857,250

[22] Filed: Apr. 30, 1986

[30] Foreign Application Priority Data

May 1, 1985 [JP] Japan .................................. 60-94767

[51] Int. Cl.⁴ .......................... B05D 3/02; B05D 5/00; B01D 50/00
[52] U.S. Cl. ...................................... 427/244; 55/487; 210/490; 264/45.1; 427/389.9; 427/378
[58] Field of Search ..................... 427/244, 430.1, 439, 427/389.9, 378; 210/490, 491, 500.27, 500.29, 506, 507, 508; 55/487; 264/45.1

[56] References Cited

U.S. PATENT DOCUMENTS 4,093,437 6/1978 Ichihara et al. ........................ 55/487
4,093,763 6/1978 Hartmann et al. .............. 427/378 X
4,525,374 6/1985 Vaillancourt ................... 427/244 X

FOREIGN PATENT DOCUMENTS 56-124413 11/1981 Japan .
57-75117 5/1982 Japan .

Primary Examiner—Michael R. Lusignan
Attorney, Agent, or Firm—Cushman, Darby & Cushman

[57] ABSTRACT

A filter for an air cleaner is produced by impregnating a fiber web composed of one or more layers with a liquid binder in the form of solution, suspension, or emulsion. The impregnated fiber web is dried such that the solvent or dispersing medium on one side evaporates faster then that on the other side. As the result, more binder is deposited on one side than on the other side; in other words, a gradient of binder distribution is formed. The thus-produced filter has such a structure that the voids among fibers continuously change across the thickness, while fibers are bonded together by the binder. The filter thus produced can collect more dust than a conventional one.

10 Claims, 13 Drawing Figures

FIG.1

DRY AIR

FIG.2

COOLING

INFRARED LIGHT

METHOD OF PRODUCING FILTER FOR AIR CLEANER

FIELD OF THE INVENTION

The present invention relates to a method of producing an air cleaning filter for automotive engines and air conditioners, and more particularly, it relates to an improved method for bonding with a binder the fiber web constituting the filter.

DESCRIPTION OF THE PRIOR ART

Figure 6:
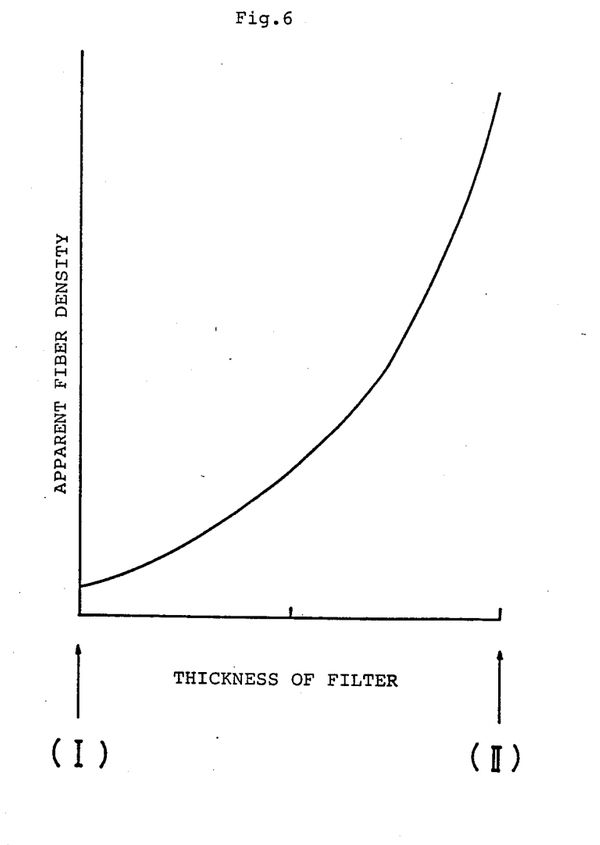
FIG. 6 is a graph showing the ideal gradient of apparent density of a filter across the thickness thereof.

Heretofore, it has been believed that the filter should preferably have a gradient in apparent fiber density (including the binder) as depicted in FIG. 6. In other word, the fiber density at the inflow side is low and it is high at the outflow side, and the density gradient is exponential. A filter having a reverse density gradient will not catch dust sufficiently and will be poor in dust collection.

There is disclosed a filter made of density gradient nonwoven fabric in Japanese Unexamined Published Patent Application No. 124413/1981. This nonwoven fabric is produced by laminating a plurality of fiber layers each having a different density, so that it has a density gradient across the thickness of the filter. There is also disclosed another type of density gradient filter in Japanese Unexamined Published Patent Application No. 75117/1982. It is produced by applying a powder binder to a fiber web to have a density gradient of the powder binder across the thickness of the fiber web, followed by heat pressing. Disadvantages of this method are that the powder binder cause clogging if the fiber density is high, and the powder binder passes through the fiber layer when the fiber density is low. Thus this method limits the fiber density or the particle size of the powder binder.

SUMMARY OF THE INVENTION

It is an object of the present invention to provide a method of producing a filter superior in filtration performance. According to the method of this invention, a liquid binder is used to bind the fibers and the distribution of the binder is given a gradient across the thickness of the fiber web. In other words, the void volume in the fibers constituting the filter gradually changes across the thickness.

According to the method of this invention, an air cleaning filter is produced as follows: A fiber web composed of one or more layers is impregnated with a binder in the form of solution, suspension, or emulsion (collectively called solution hereinafter, unless otherwise stated). The impregnated fiber web is dried such that the solvent or dispersing medium (collectively called solvent hereinafter, unless otherwise stated) on one side evaporates faster than that on the other side; in other words, a gradient of binder distribution is formed. The thus-produced filter has such a structure that the voids among fibers continuously change across the thickness, while the fibers are bonded together by the binder.

DETAILED DESCRIPTION OF THE INVENTION

The fiber web used for the method of this invention is a sheetlike web formed by assembling uniformly or randomly long and short fibers of polyester, rayon, nylon, or the like or a sheetlike web formed by spun-bonding. The spun-bonded web is one in which thermoplastic filaments such as polyester are joined at random points by heat-bonding. The conventional fiber web can be used in this invention. The fiber web may be composed of two or more fiber layers laminated one over another, they may be physically bonded by a needle punching method, stitching method, jet bonding method, or point bonding with heat, high frequency, or ultrasonic excitation. For improved filtration performance, the filter is formed by laminating two or more fiber layers which are different in fiber thickness, and the laminate is formed such that a fiber layer of thicker fibers is placed at the inflow side and a fiber layer of thinner fibers is placed at the outflow side. Since the former has larger voids and the latter has smaller voids, a gradient of voids is formed across the thickness of the filter. A spun-bonded fiber layer is advantageous, because fibers are firmly joined together, which leads to an increased strength and hence a reduced thickness, and bonding requires a lower amount of binder.

The binder used for the method of this invention is a thermoplastic or thermosetting resin such as acrylic ester, water-soluble phenol, and epoxy resin, in the form of solution, suspension, or emulsion dissolved or dispersed in a solvent or dispersing medium. The fiber web is impregnated with this binder by dipping, rolling, spraying, penetration, or other conventional methods.

The drying of the binder, which constitutes a feature of the invention, is carried out in such a manner that the solvent of the binder is evaporated faster on one side than on the other side. During evaporation, the binder solution partly moves to that side where evaporation takes place faster than to the other side.

This unbalanced evaporation may be carried out in by any of the following three methods. According to the first method, a dry gas (usually dry air) free of solvent vapor is blown against one side. The blown dry air diffuses the solvent vapor into the air, accelerating evaporation. As the result, the concentration of the solution increases at one side of the web. This brings about a gradient of solution concentration in the fiber web. Since the solution tends to eliminate the gradient of concentration, the solution partly moves to that side where evaporation is fast from the other side where evaporation is slow. The continued movement of the solution results in a gradient of binder in the web when the solvent has completely evaporated.

According to the second method, one side of the impregnated web is heated. Heating increases the vapor pressure of the binder solvent, accelerating the diffusion of the solvent into the air from one side of the web, as in the case of the first method. The heating medium used for this method is not specifically limited so long as it is capable of temperature control. A preferred heating medium is one which can be heated rapidly, because it is deprived of heat of vaporization as the solvent evaporates on one side of the web. Infrared heating is particularly preferred because it induces the thermal motion of molecules constituting the fibers and solvent.

According to the third method, one side of the web is cooled, while the binder solvent is allowed to evaporate naturally on the other side of the web. In other words, the evaporation rate on one side is reduced while that on the other side is left unchanged. Cooling may be carried out with water, air, or refrigerant.

The above-mentioned three methods may be used individually or in combination with one another. For efficient evaporation of solvent, the web may be properly positioned according to the specific gravity of solvent vapor to air. For example, the side of the web for faster evaporation may be downward when the solvent vapor is heavier than air and the side may be upward when the solvent vapor is lighter than air. Reversely, the side of the web for slower evaporation may be upward when the solvent vapor is heavier than air and the side may be downward when the solvent vapor is lighter than air. In another method, the side for slower evaporation may be covered with an impervious material to prevent the diffusion of the solvent vapor from the side of slower evaporation.

Where the method of this invention is applied to a fiber web formed by laminating layers of different density, the faster evaporation should take place on the high-density side composed of finer fibers and the slower evaporation should take place on the low-density side composed of thicker fibers. This results in such a gradient that the binder is deposited more on the high-density side than on the low-density side. In other words, the gradient of the fiber density coincides with that of the binder, and this synergistically increases the apparent density ingredient, improving the filtration performance.

An advantage of this invention is that the liquid binder is capable of adjustment of concentration in a desired range, unlike the conventional powder binder composed of 100% solids. Binding means bridging adjacent fibers with a binder. A liquid binder forms thinner bridges than a powder binder. Assuming that the number of bridging points is the same, a liquid binder affords a greater void volume than a powder binder. In addition, a liquid binder permits the control of void volume according to its concentration. Additionally, a liquid binder has a lower possibility of causing the disadvantage that voids among fibers are partly filled with binder. Therefore, a liquid binder is advantageous in being capable of reducing the resistance of air flow in the filter. Another advantage of a liquid binder is that it can be applied to fibers of any diameter and it is exempt from the limitation of particle size.

Finally, liquid binder readily infiltrates into the web, providing reinforcement and dimensional stability.

According to this invention, it is possible to reduce the thickness of the filter without sacrificing the filtration performance on account of the density gradient formed as mentioned above. A thinner filter can have a broader filtration area in a given volume of an air cleaner. The filter produced according to the method of this invention may be corrugated, if necessary, to improve further the performance as an cleaner.

EXAMPLES

Figure 1:
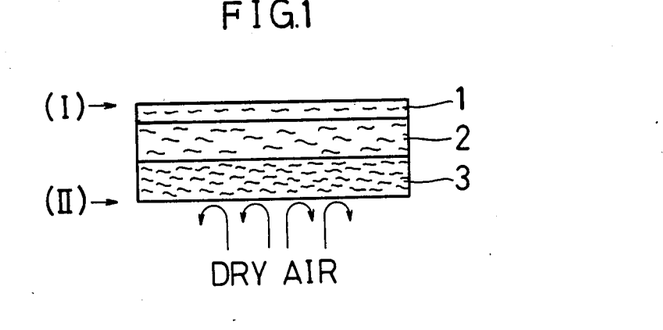
FIG. 1 is an explanatory drawing showing a method of evaporating the solvent of the binder with dry air.

FIG. 1 is an explanatory view showing the first example according to the method of this invention. The filter is composed of an upper layer 1, an intermediate layer 2, and a lower layer 3. The upper layer 1, which is at the inflow side in this example, is a spun-bonded polyester fiber layer having a void volume of about 88% and a basis weight of 50 g/m$^2$, the polyester having a thickness of 0.7 to 3 denier. The intermediate layer 2 is a mixed fiber layer composed of 50% of 1 denier rayon fibers, 35% of 1.25 denier polyester fibers, and 15% of 1.5 denier polyolefin fibers. It has a basis weight of 40 g/m$^2$. The lower layer 3 at the outflow side is a mixed fiber layer composed of 40% of 1 denier rayon fibers and 60% of 1.25 denier polyester fibers. It has a basis weight of 50 g/m$^2$. After lamination one on top of the other, the three fiber layers were bonded together by needle punching. The resulting fiber web was about 6 mm thick. The fiber web was impregnated by dipping with an aqueous binder (solvent being water) containing 20% of acrylate ester-vinyl acetate copolymer. The amount of impregnation was 175 g/m$^2$. The solvent of the binder was evaporated by blowing dry air (110° C., 10% humidity, at a flow rate of 22 m$^3$/min.m$^2$ for 0.1 hour) vertically upward against the lower layer 3 positioned downward. Thus there was obtained a filter having a thickness of 0.7 mm. The void volume in the upper layer 1, intermediate layer 2, and lower layer 3 was 92%, 93.4% and 78%, respectively.

The resulting filter was evaluated according to JIS D1612. The evaluation test was conducted by filtering air containing 1 g/m$^3$ of dust (Class 8 powder specified by JIS Z8901) at a flow rate of 1.2 m$^3$/min and a pressure loss of 300 mmAg. The result was expressed in terms of the amount of dust collected. The evaluation test was also conducted by filtering air containing 177 mg/m$^3$ of carbon at a flow rate of 1.2 m$^3$/min and a pressure loss of 300 mmAg. The result was expressed in terms of the amount of carbon collected.

For the purpose of comparison, a fiber web was prepared and impregnation was carried out in the same manner as mentioned above. However, the evaporation of the solvent was accomplished in a conventional way by blowing dry air (110° C., 10% humidity) at a flow rate of 22 m$^3$/min.m$^2$ for 0.1 hour vertically downward against the upper layer 1 (spun-bonded fiber layer) positioned upward. The resulting filter was 0.7 mm thick. The void volume in the upper layer 1, intermediate layer 2, and lower layer 3 was 77% 73%, and 81%, respectively. The filter for comparison was evaluated in the same manner as mentioned above, and the amount of dust and carbon collected was measured. The results are shown in Table 1. It is to be noted that the filter of the present invention produced in the example collects 1.8 times more dust and 2.6 times more carbon than the filter produced in the comparative example.

TABLE 1

| Example | Amount of dust collected (g) | Amount of carbon collected (g) |
|---|---|---|
| Example 1 | 22.5 | 0.52 |
| Comparative Example 1 | 12.0 | 0.20 |

Figure 2:
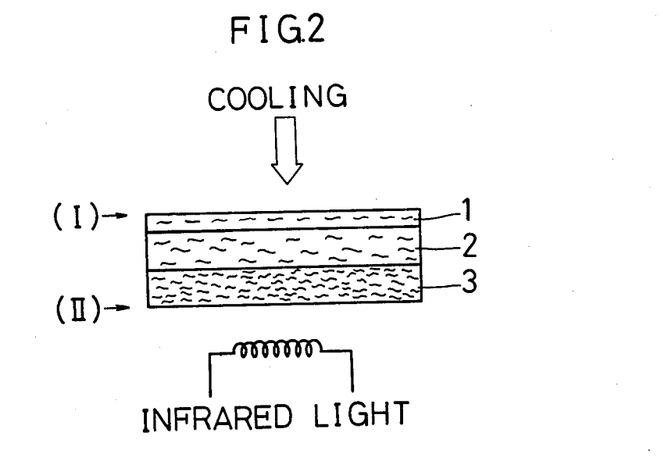
FIG. 2 is also an explanatory drawing showing a method of evaporating the solvent of the binder with heating by infrared light.

FIG. 2 is an explanatory view showing the second example according to the method of this invention. The filter is composed of an upper layer 1, an intermediate layer 2, and a lower layer 3. The upper layer 1, which is at the inflow side in this example, is a spun-bonded polyester fiber layer having a void volume of about 88% and a basis weight of 50 g/m$^2$. The polyester fiber has a thickness of 0.7 to 5 denier. The intermediate layer 2 is a mixed fiber layer composed of 70 to 40% of 1 denier rayon fibers and 30 to 60% of 1.25 denier polyester fibers. It has a basis weight of 50 g/m$^2$. The lower layer 3 at the outflow side is a mixed fiber layer composed of 60 to 0% of 1 denier rayon fibers and 40 to 100% of 1.25 denier polyester fibers. It has a basis weight of 45 g/m$^2$. After lamination one on top of the other, the three fiber layers were bonded together by needle punching. The resulting fiber web was about 5.5 mm thick. The fiber web was impregnated by dipping with an aqueous binder (solvent being water) containing 20% of acrylate ester - vinyl acetate copolymer. The amount of impregnation was 200 g/m$^2$. The solvent of the binder was evaporated by irradiating with infrared rays vertically upward from a distance of 10 cm from the surface of the lower layer 3 for 0.2 hour, so that the surface temperature of the lower layer 3 reached 120° C. At the same time, air was blown vertically downward against the upper layer 1 for 0.2 hour, so that the surface temperature of the upper layer 1 was kept at 50° C. Thus there was obtained a filter having a thickness of 0.6 mm. The void volume in the upper layer 1, intermediate layer 2, and lower layer 3 was 86%, 77%, and 68%, respectively.

The resulting filter was evaluated accordingly to JIS D1612. The evaluation test was conducted by filtering air containing 1 g/m$^3$ of dust (Class 8 powder specified by JIS Z8901) at a flow rate of 1.2 m$^3$/min.m$^2$ and a pressure loss of 300 mmAg. The result was expressed in terms of the amount of dust collected. The evaluation test was also conducted by filtering air containing 177 mg/m$^3$ of carbon at a flow rate of 1.2 m$^3$/min.m$^2$ and pressure loss of 300 mmAg. The result was expressed in terms of the amount of carbon collected.

Figure 3:
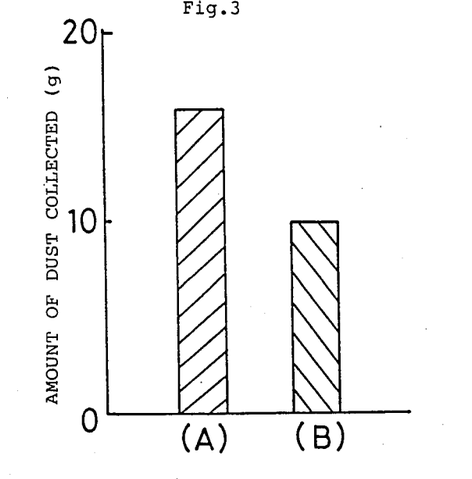
FIG. 3 is a bar chart showing the amount of dust collected by the filter produced in an example of the present invention and a conventional filter.
Figure 4:
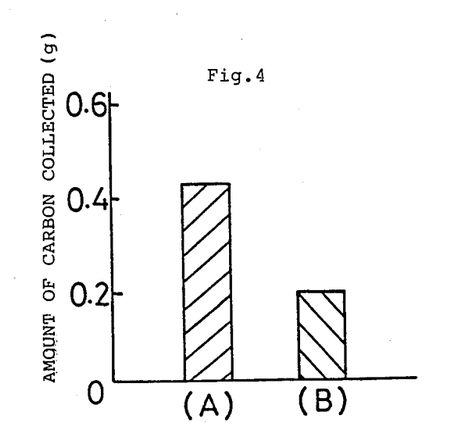
FIG. 4 is also a bar chart showing the amount of carbon collected by the filter produced in an example of the present invention and a conventional filter.

For the purpose of comparison, a fiber web was prepared and impregnation was carried out in the same manner as mentioned above. However, the evaporation of the solvent was accomplished in a conventional way by blowing dry air (110° C., 10% humidity) at a flow rate of 22 m$^3$/min.m$^2$ for 0.1 hour vertically downward against the upper layer 1 (spun-bonded fiber layer) positioned upward. The resulting filter was 0.6 mm thick. The void volume in the upper layer 1, intermediate layer 2, and lower layer 3 was 78%, 78%, and 74%, respectively. The filter for comparison was evaluated in the same manner as mentioned above, and the amount of dust and carbon collected was measured. The results are shown in FIG. 3 and FIG. 4. The filter obtained in Example 2 according to the method of the present invention is indicated by "(A)" and the filter obtained in Comparative Example 2 is indicated by "(B)". The bar chart in FIG. 3 indicates the amount of dust collected. It is noted that the amount of dust collected is 16 g in the case of "(A)", whereas it is 10 g in the case of "(B)". According to the result, the amount of dust collected by the filter of Example 2 is 1.6 times more than that collected by the filter of Comperative Example 2. The bar chart in FIG. 4 indicates the amount of carbon collected. It is noted that the amount of carbon collected is 0.43 g in the case of "(A)", whereas it is 0.19 g in the case of "(B)". According to the result, the amount of carbon collcted by the filter of Example 2 is 2 times more than that corrected by the filter of Comperative Example 2.

Figure 5:
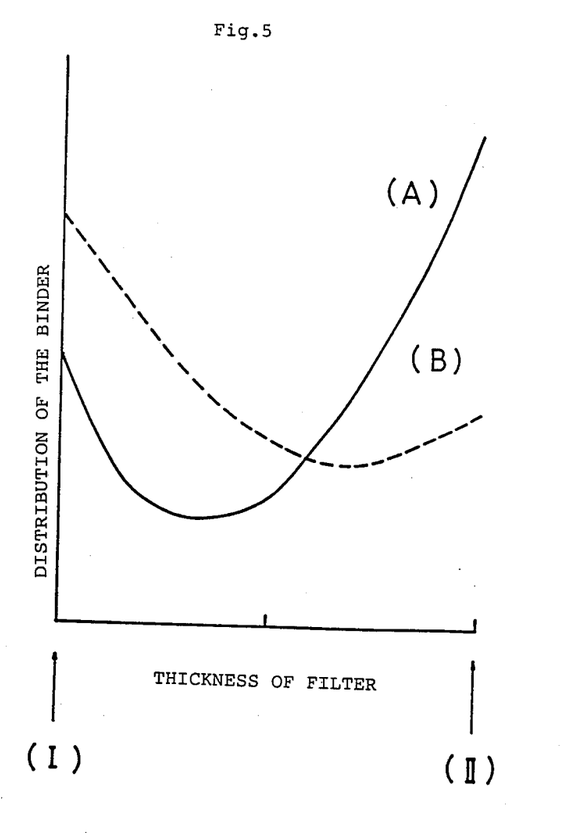
FIG. 5 is a graph showing the distribution of the binder across the thickness of the filter produced in an example of the present invention and a conventional filter.

FIG. 5 shows the distributions of the binder plotted against the thickness (abscissa) of the filters produced in Example 2. It is noted that the amount and Comparative Example 2. It is noted that the amount of the binder at the inflow side (I) is less in the case of "(A)" than in the case of "(B)", whereas it is reversed at the outflow side (II). This apparently indicates that there is a greater gradient of binder distribution in Example 2 of the present invention than in Comparative Example 2. The density gradient curve of Example 2 in the present invention is close to that shown in FIG. 6 which is regarded as an ideal.

Figure 7:
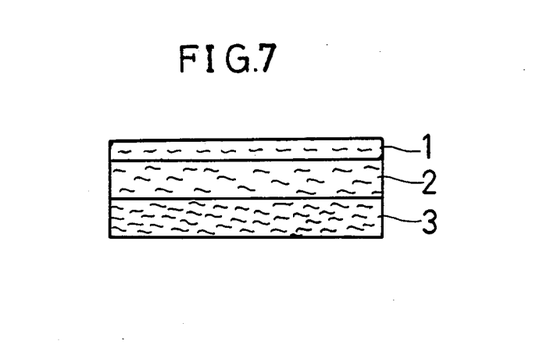
FIG. 7 is a sectional view of a filter produced by an Example 3 of the present invention.
Figure 8:
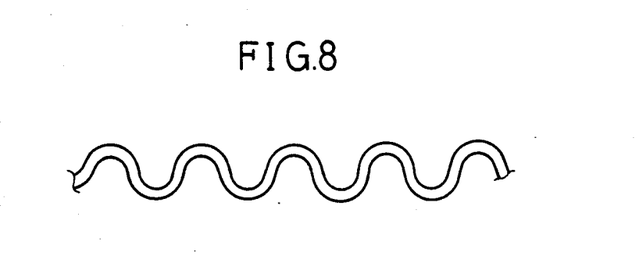
FIG. 8 is shows a filter corrugated by a pair of rolls.

FIG. 7 is a sectional view of the filter produced in the third example according to the method of this invention. The filter is composed of an upper layer 1, and an intermediate layer 2, and a lower layer 3. The upper layer 1, which is at the inflow side in this example, is a spun-bonded polyester fiber layer having a void volume of about 88% and a basis weight of 25 g/m$^2$. The thickness of the polyester is of from 0.7 to 3 denier. The intermediate layer 2 is a mixed fiber layer composed of 50% of 1 denier rayon fibers, 35% of 1.25 denier polyester fibers, and 15% of 1.5 denier polyolefin fibers. It has a basis weight of 40 g/m$^2$. The lower layer 3 at the outflow side is a mixed fiber layer composed of 50% of 1 denier rayon fibers and the balance of 50% of 1.25 denier polyester fibers. It has a basis weight of 50 g/m$^2$. After lamination one on top of the other, the three fiber layers were bonded together by needle punching. The resulting fiber web was about 6 mm thick. The fiber web was impregnated by dipping with an aqueous binder (solvent being water) containing 20% of acrylate ester - vinyl acetate copolymer. The amount of impregnation was 175 g/m$^2$. The solvent of the binder was evaporated by blowing dry air (110° C., 10% humidity, at a flow rate of 22 m$^3$/min.m$^2$ for 0.1 (hour) vertically upward against the lower layer 3 positioned downward. The void volume in the upper layer 1, intermediate layer 2, and lower layer 3 was 84.2%, 89.9%, and 80%, respectively. The filter was then corrugated as shown in FIG. 8 by being passed between a pair of heated rolls having rugged surfaces. Thus there was obtained a filter having a thickness of 0.45 mm.

Figure 9:
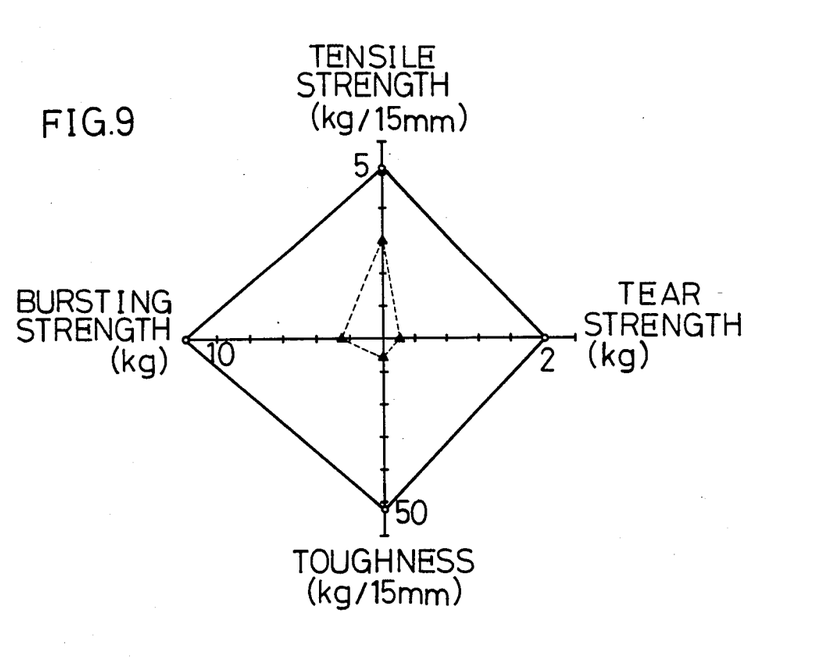
FIG. 9 shows a comparison of the values of strength against various impacts between a filter of Example 3 in the present invention and a conventional filter.

FIG. 9 shows the comparison of the values of strength against various impact between a filter of the Example 3 produced according to the method of the present invention and a conventional filter having a thickness of 0.3 mm. The solid line in the figure shows the filter of the Example 3 produced according to the present invention and the broken line shows the conventional filter. It is obvious that the strength of the filter produced by the present invention is far superior to that of the conventional ones.

Next, experiments are carried out on the filter produced according to the Example 3, which is composed of a spun-bonded layer 1, intermediate layer 2, and lower layer 3 as shown in FIG. 7. One experiment is conducted according to JIS D 1612 by filtering air containing 1 g/m$^3$ of dust (Class 8 powder specified by JIS Z8901), at a passing air speed of 5 cm/sec and a pressure loss of 300 mmAg. The amount of dust collected under the above said condition is measured and the measured amount is converted into the amount per m$^2$.

Figure 10:
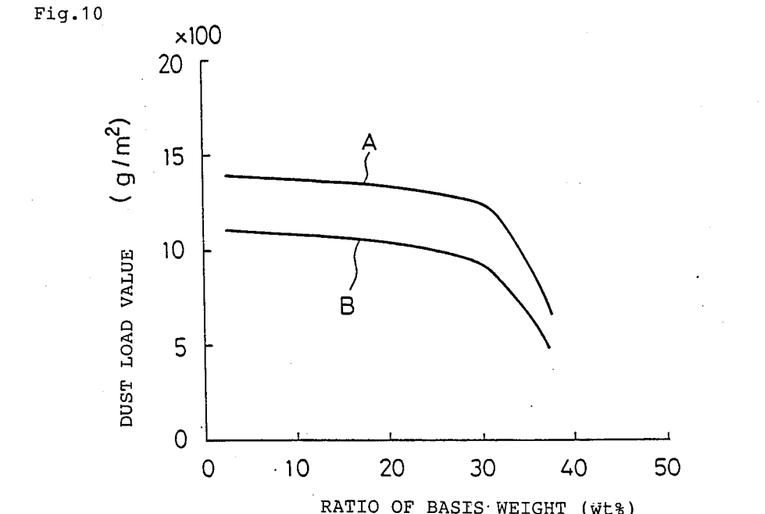
FIG. 10 is a graph showing the relation between basis weight of the spun-bonded layer and dust load amount.

FIG. 10 shows the relation between the basis weight of the spun-bonded fiber layer and dust load amount. In FIG. 10, the line A shows the case of the filter with a thickness of 1.2 mm and the line B shows the case of the filter with a thickness of 0.25 mm. In both cases, the amount of dust collected is greatly reduced when the ratio of basis weight of the spun-bonded fiber layer 1 exceeds 30 wt %.

Figure 11:
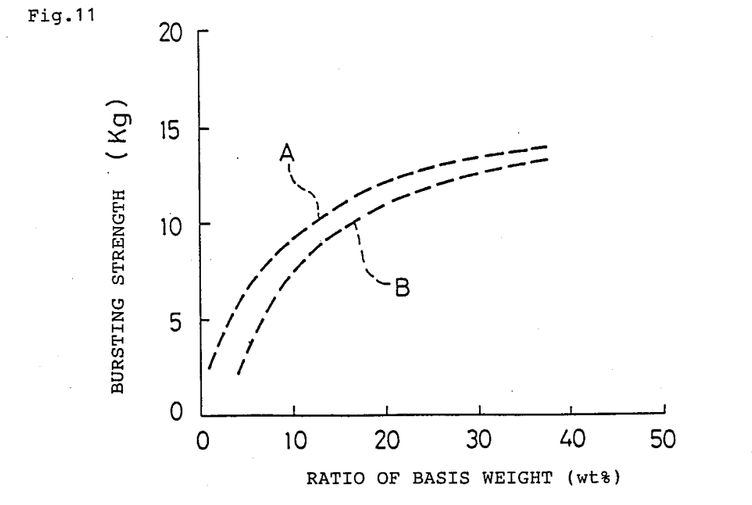
FIG. 11 is a graph showing the relation between basis weight of the spun-bonded layer of the filter of the present invention and the hardness of the filter evaluated by bursting strength

FIG. 11 shows the result of an another experiment concerning the relation between basis weight of the spun-bonded layer 1 and the hardness of filter which is evaluated by bursting strength. The evaluation of the bursting strength is obtained by means of a Müllen bursting strength tester accordingly to JIS P8112. According to the results of the experiment, the hardness of the filter increases as the ratio of basis weight of the spun-bonded fiber layer 1 increases. Another result of the experiment is that in order for the filter to be corrugated, the hardness of the filter should be not less than 6.5 kg. For example, in the case of the filter with a thickness of 1.2 mm (Line A), the ratio of basis weight of the spun-bonded layer should be not less than 5%, and the filter with a thickness of 0.25 mm (Line B), the ratio of basis weight of the spun-bonded fiber layer should be not less than 8.5%.

Figure 12:
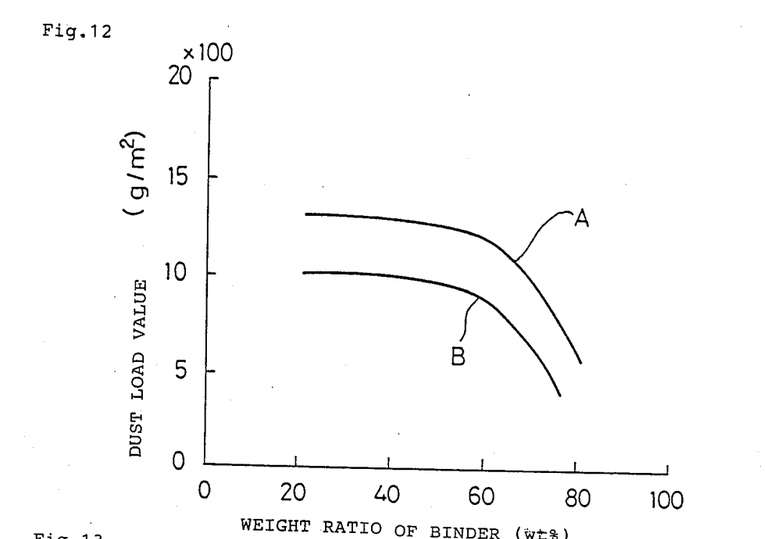
FIG. 12 is a graph showing the relation between weight % of binder on the bases of the filter weight and dust load value.

The graph of FIG. 12 shows the relation between weight percent of binder in the filter of the fiber web and dust load value. The results show that, on both filters of 1.2 mm (Line A) and 0.25 mm (Line B), the amount of dust collected is greatly reduced when weight percent of binder in the fiber web exceeds 60%.

Figure 13:
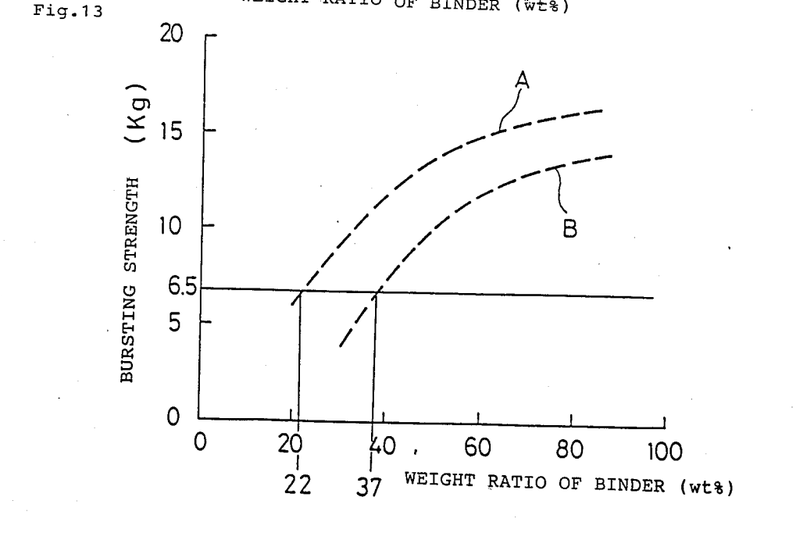
FIG. 13 is a graph showing the relation between weight % of binder on the bases of the filter weight and hardness of filter evaluated by bursting strength.

The graph of FIG. 13 shows the results of another experiment concerning the relation between weight percent of binder in the filter of the fiber web and hardness (bursting strength) obtained in the filter. The hardness of the filter increases as the weight percent of binder in the fiber web increases, and that fact is believed to be clear from in FIG. 13. In order to obtain the hardness of 6.5 kg to corrugate the filter, not less than 22 wt % of binder in filter may be required in the case of the 1.2 mm thick filter, and 37 wt % of binder may be required to do the same in the case of the 0.25 mm thick filter.

It is noted that according to the above described experiments, the results of which are shown in FIGS. 12 and 13, the desirable weight ratio of binder in the filter may be from 20% to 60%.

The filter of the present invention illustrated by the above examples is a filter composed of a spurn-bonded layer and other fiber layers integrated together and the filter has a binder gradient distribution across the thickness of the filter. The thickness of the filter is adjusted so as to be in the range of 0.25 to 1.2 mm.

According to this invention, the spun-bonded filter layer may be formed in extremely reduced thickness of from 0.04 to 0.15 mm. The thus-formed thin spun-bonded layer is laminated with other fiber layers and bonded together to form a resulting fiber web. Then, the resulting fiber web is impregnated with liquid binder and is rolled. In this procedure, a filter is produced with its thickness far thinner than that of the conventional filter of density gradient type.

Namely, a filter obtained by the method of the present invention has a far superior strength than that of a conventional single layer filter of almost the same thickness and the capacity of dust collection per m$^2$ is also superior because coarse dust is collected in the filter part of spun-bonded layer in which void volume is relatively large while fine dust is collected in the part of other layers in which void volume is relatively small. A large diameter of filtration area is obtainable equal to that of the conventional filter in the case of installation in a limited space, for example, when it is used to an automotive air cleaner.

The spun-bonded fiber layer used in this invention may be composed of polypropylene fibers instead of polyester fibers or may be composed of the two kinds of fibers. In the above-mentioned examples, the intermediate and lower layers are composed of rayon fibers and polyester fibers. Additionally, they may be used individually or in combination with polyamide fibers and vinylon fibers, and each individual polyamide fibers and vinylon fibers may also be used.

The weight ratio of the binder should preferably be about 20 to 60 wt % of the total weight (composed of the upper layer, intermediate layer, and lower layer). The thickness of the finished filter should preferably be about 0.25 to 1.2 mm. This range of thickness is an ideal compromise between the dust collecting performance and the bursting strength. The above thickness range also achieves passing air speed almost equal to that of the single layer filter when it is used to an automotive air cleaner, for example.

The basis weight of the spun-bonded fiber layer should preferably be about 5 to 30 wt % of that of the intermediate layer and lower layer. This ratio is required to satisfy the conditions just mentioned above.

What is claimed is:

1. A method for producing a filter for an air cleaner which comprises the steps of impregnating a sheetlike web of fibers, which has two opposite sides separated by a body of the web having a thickness direction extending between said sides, with a solution, suspension, or emulsion containing a binder dissolved or suspended in a solvent or dispersing agent and, differentially drying the impregnated fiber web with respect to said two opposite sides thereof such that said solvent or dispersing agent evaporates from one of said sides faster than from the other of said sides for moving the solution, suspension, or emulsion along the thickness direction of said web from nearer one said side towards the other said side and thereby progressively depositing more binder in said body towards said one side than towards said other side joining said fibers with said binder and causing said filter to have a density gradient in which density decreases progressively across the thickness of said body from said one side to said other side.

2. A method for producing a filter for an air cleaner as set forth in claim 1, wherein
the evaporation of the solvent or dispersing medium from one side is accelerated by blowing a gas containing no solvent or dispersing agent against one side of the web.

3. A method for producing a filter for an air cleaner as set forth in claim 1, wherein
the evaporation of the solvent or dispersing medium from one side is accelerated by keeping one side at a higher temperature than the other side.

4. A method for producing a filter for an air cleaner as set forth in claim 1, wherein
the fiber web is composed of at least two fiber layers which are different in fiber diameter, one fiber layer of small fiber diameter being arranged at one side and the other fiber layer of large fiber diameter being arranged at the other side.

5. A method for producing a filter for an air cleaner as set forth in claim 1, wherein
the fiber web includes a spun-bonded fiber layer in which fibers are joined with one another by fusion-bonding.

6. A method for producing a filter for an air cleaner as set forth in claim 1, wherein
the fiber web is composed of a first fiber layer constructed mainly of hydrophilic fibers and a second fiber layer laminated thereon, said second fiber layer being constructed of spun-bonded fibers of hydrophobic thermoplastic resin, said spun-bonded fibers being partly joined together by fusion bonding.

7. A method for producing a filter for an air cleaner as set forth in claim 6, wherein
the first fiber layer contains fibers of at least one kind of rayon, nylon, and polyester, and the second fiber layer is constructed of polypropylene fibers and/or polyester fibers.

8. A method for producing filter for an air cleaner as set forth in claim 6, wherein
the fiber web contains about 20 to 60 wt % of binder based on the weight of the fiber web after impregnation with a binder.

9. A method for producing a filter for an air cleaner as set forth in claim 8, wherein
the fiber web is formed so that it has a thickness of about 0.25 to 1.2 mm after impregnation with a binder.

10. A method for producing a filter for an air cleaner as set forth in claim 9, wherein
the basis weight of the spun-bonded fiber layer is about 5 to 30 wt % of that of the hydrophilic fiber layer.

* * * * *